United States Patent
Yang

(10) Patent No.: US 8,734,284 B1
(45) Date of Patent: May 27, 2014

(54) DIFFERENTIAL AND ACTIVE TORQUE VECTORING

(71) Applicant: Lei Yang, Novi, MI (US)

(72) Inventor: Lei Yang, Novi, MI (US)

( * ) Notice: Subject to any disclaimer, the term of this patent is extended or adjusted under 35 U.S.C. 154(b) by 0 days.

(21) Appl. No.: 14/047,045

(22) Filed: Oct. 7, 2013

(51) Int. Cl.
  *F16H 48/20* (2012.01)

(52) U.S. Cl.
  USPC ........................................................ 475/248

(58) Field of Classification Search
  USPC ......... 475/248, 331, 343, 334, 346, 220, 249, 475/252, 230, 251, 224, 244, 223, 231
  See application file for complete search history.

(56) References Cited

U.S. PATENT DOCUMENTS

| | | | |
|---|---|---|---|
| 7,238,140 B2 | 7/2007 | Gradu | |
| 7,491,147 B2 | 2/2009 | Ross | |
| 7,641,581 B2 * | 1/2010 | Yamazaki | 475/252 |
| 7,708,665 B2 | 5/2010 | Wheals | |
| 7,811,194 B2 | 10/2010 | Bowen | |
| 7,896,771 B2 | 3/2011 | Bowers | |
| 7,951,036 B2 | 5/2011 | Sackl | |
| 8,012,058 B2 * | 9/2011 | Fujii et al. | 475/249 |
| 8,128,526 B2 * | 3/2012 | Engelmann et al. | 475/249 |
| 8,133,146 B2 * | 3/2012 | Radzevich et al. | 475/248 |
| 8,475,321 B2 * | 7/2013 | Gutsmiedl et al. | 475/248 |
| 2006/0160652 A1 * | 7/2006 | Maki et al. | 475/248 |
| 2009/0186739 A1 * | 7/2009 | Fujii et al. | 475/248 |

\* cited by examiner

*Primary Examiner* — David D Le
*Assistant Examiner* — David J Hlavka

(57) ABSTRACT

A differential with torque vectoring comprises a differential, two gear mechanisms, and two clutches. The engagement of one of the clutches and the corresponding gear mechanism provides a yaw movement in one direction or in the opposition direction. The engagement of both clutches and the corresponding gear mechanisms provides differential lock. The differential with torque vectoring can also functions as conventional open differential.

12 Claims, 24 Drawing Sheets

DIFFERENTIAL AND ACTIVE TORQUE VECTORING

CROSS-REFERENCE TO RELATED APPLICATION

This application is a continuation-in-part of application Ser. No. 13/136,838, filed on Aug. 13, 2011, now pending.

FIELD OF INVENTION

The invention relates generally to the automotive differential and active torque vectoring and vehicle yaw control.

BACKGROUND OF THE INVENTION

The conventional open differential of the automotive vehicles can lose traction when there is slippery condition on the surface, where the vehicles drive. Many torque vectoring designs are implemented to overcome traction loss. They are incorporated with gears and clutch to transfer and alter torque from the side gars of the differential of vehicle axles in some ways. They are less effective because such torque vectoring designs apply required additional torque to one wheel at a time, instead of applying the required additional torque to both wheels of the vehicle axles.

SUMMARY OF THE INTERVENTION

The present invention relates to a design and implementation of active differential for automotive vehicles. It comprises a regular differential familiar to those in the field, two gear mechanisms, and two clutches. It can function as conventional open differential. It can also apply torque for vehicle yaw control.

DETAILED DESCRIPTION OF THE EMBODIMENTS

Figure 1:
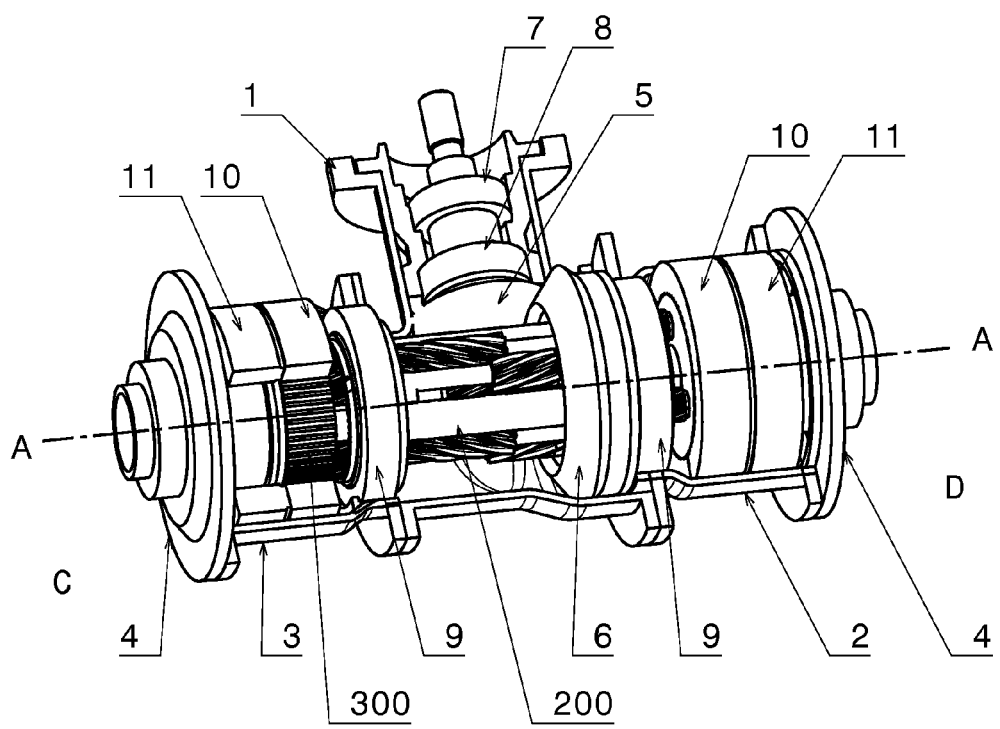
FIG. 1 is a perspective view of the vehicle axle in one embodiment.
Figure 2:
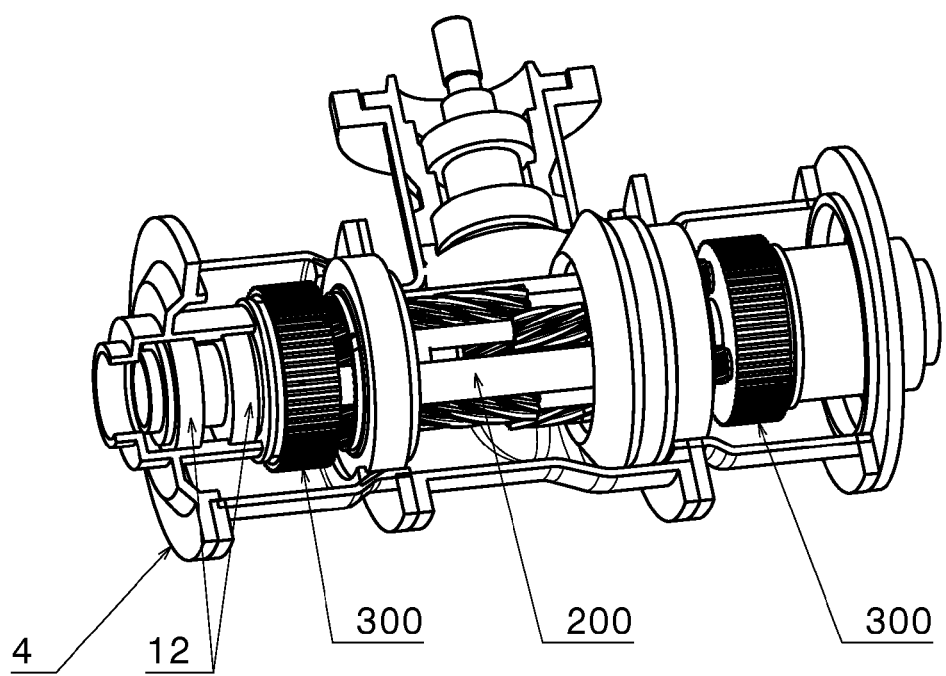
FIG. 2 is a perspective view of the vehicle axle of FIG. 1, with the clutches removed to show gear mechanisms.

FIGS. 1 and 2 show a vehicle axle 100. It composes a housing 1, a housing 2, a housing 3, two covers 4, an input gear 5, a gear 6, a differential 200, two clutches 10, two actuators 11, and two gear mechanisms 300. The housing 1, 2, 3, and the covers 4 are firmly connected with screws (not shown). The input gear 5 is pivotally supported with a bearing 7 and a bearing 8 inside the housing 1. The differential 200 is pivotally supported with two bearings 9 inside the housing 1. Each of the gear mechanism 300 is pivotally supported with two bearings 12 inside one of two the covers 4. One clutch 10 and one actuator 11 are firmly located in the housing 2, the other clutch 10 and the other actuator 11 are firmly located in the housing 3. The differential 200 and the gear mechanisms 300 rotate about an axis A. An axis B intersects the axis A at 90 degree, at the mid-point of the vehicle axle 100. The axis is 90 degree to the driving direction of the vehicle axle 100.

Figure 3:
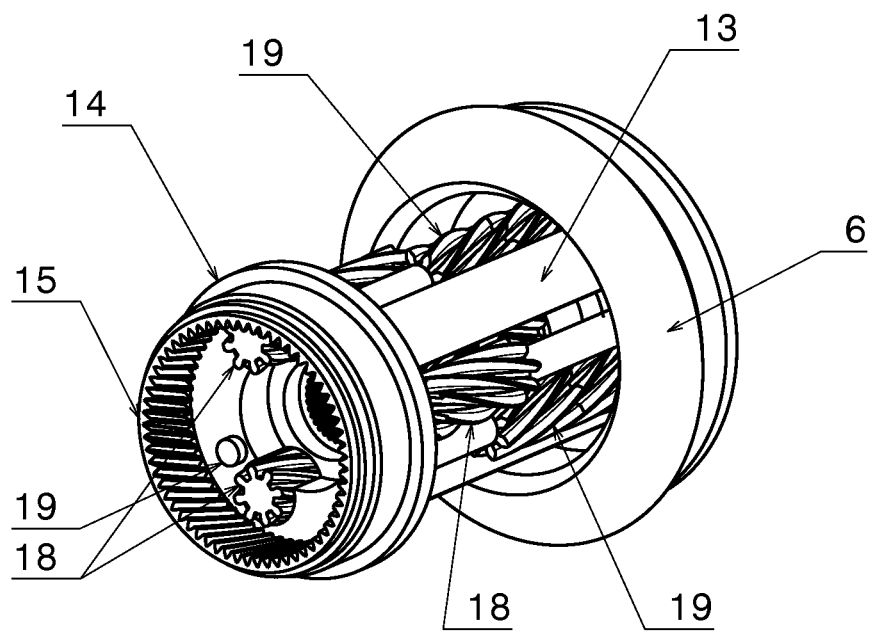
FIG. 3 is a perspective view of the differential of the vehicle axle of FIG. 1.
Figure 4:
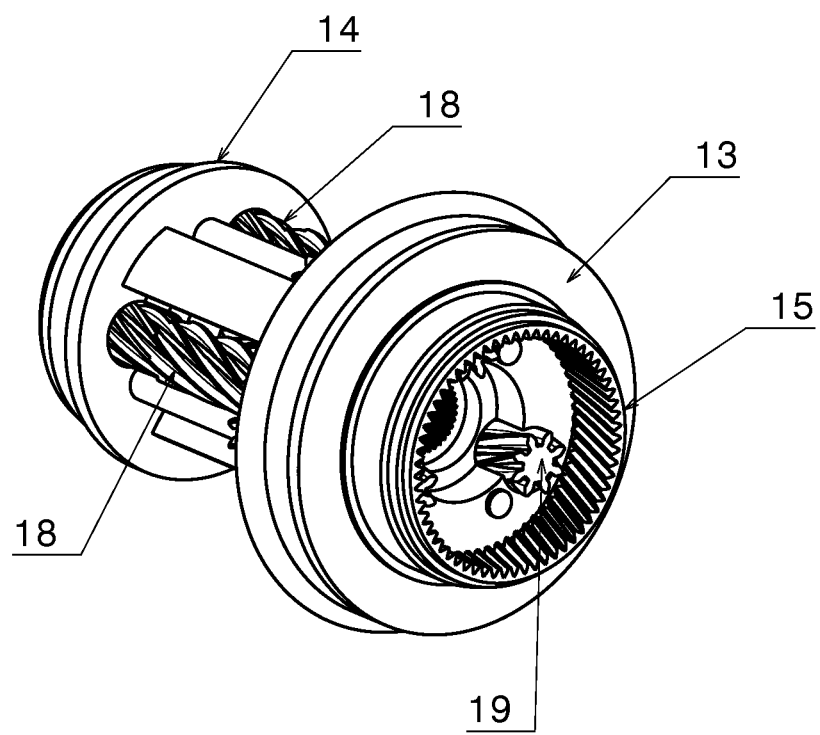
FIG. 4 is another perspective view of the differential of FIG. 3.
Figure 5:
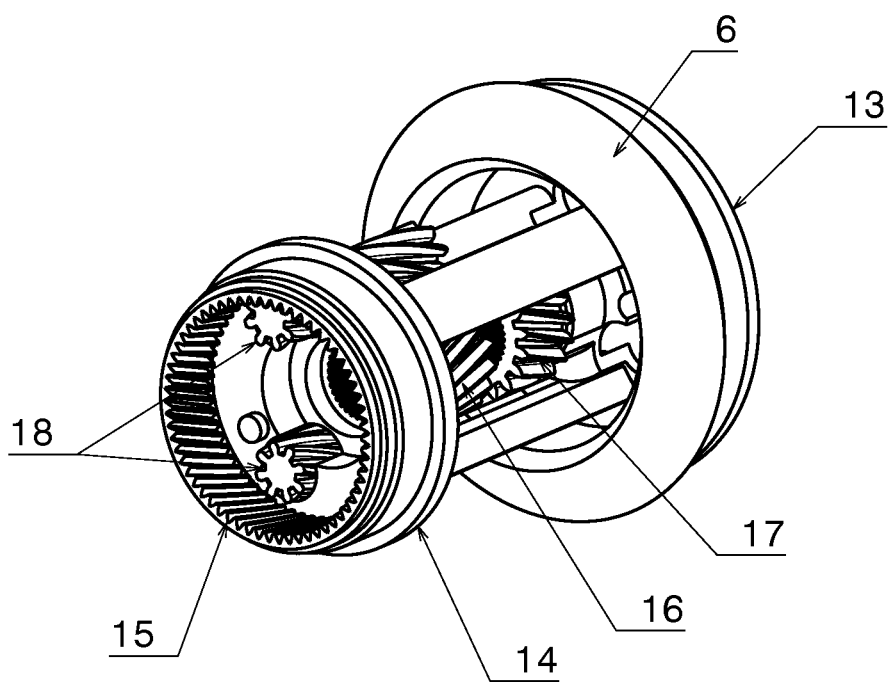
FIG. 5 is a perspective view of the differential of FIG. 3, with some of the pinion gears removed to show the side gears.
Figure 6:
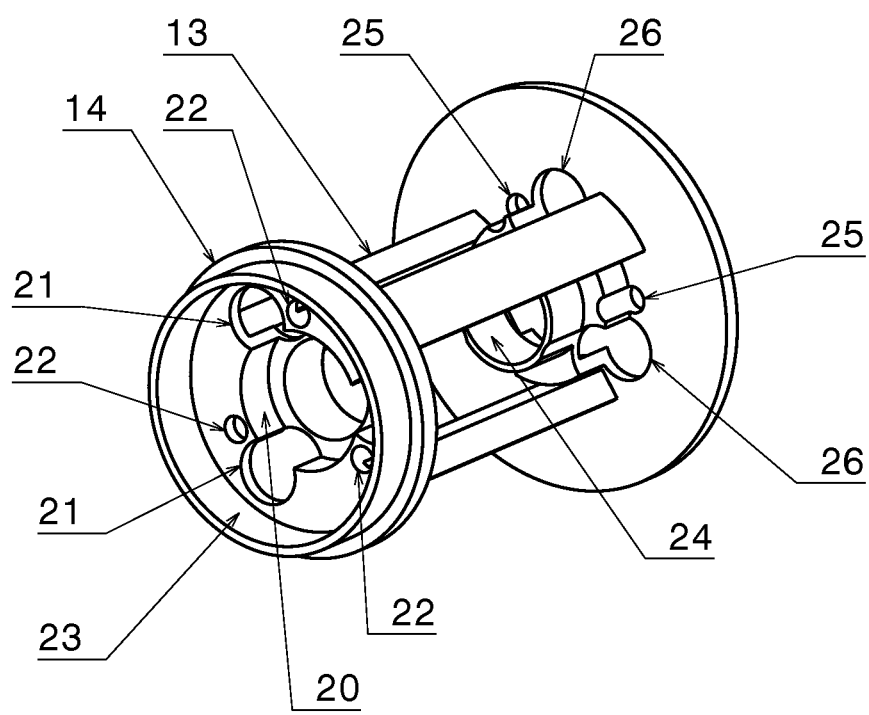
FIG. 6 is a perspective view of the differential housing and differential cover of the differential of FIG. 3.
Figure 7:
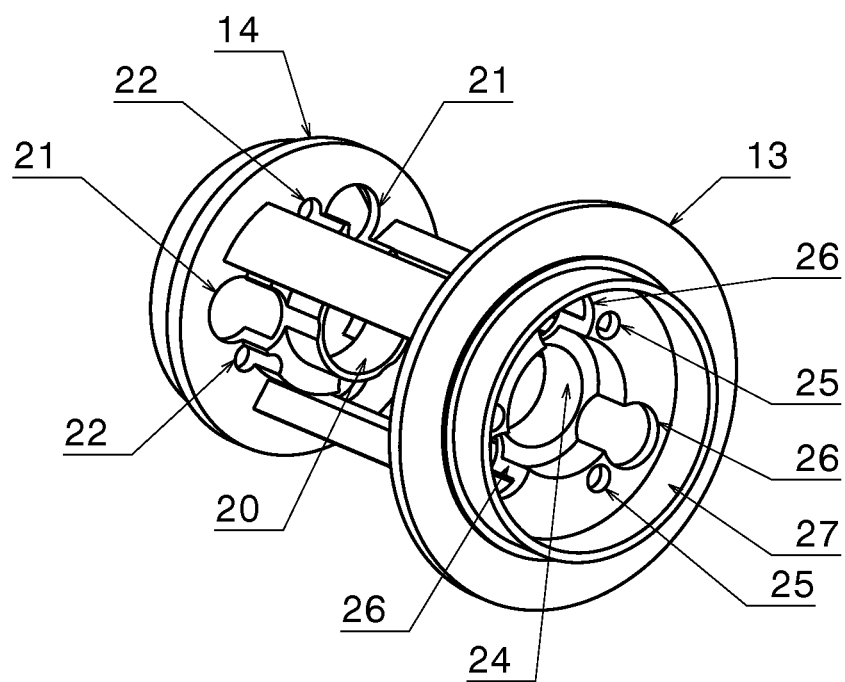
FIG. 7 is another perspective view of the differential housing and differential cover of FIG. 6.
Figure 8:
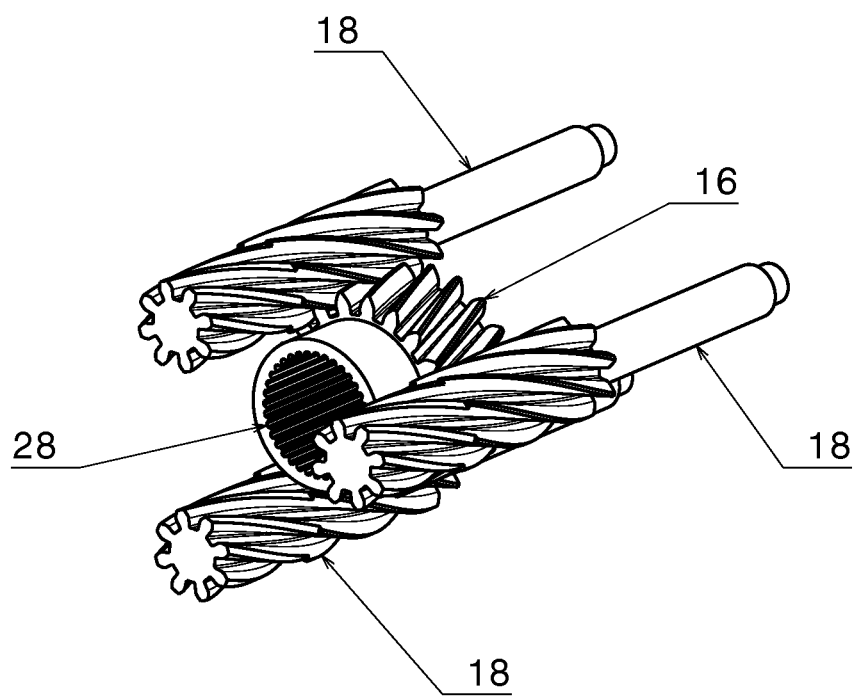
FIG. 8 is a perspective view of one side gear meshed with one set of pinion gears of the differential.
Figure 9:
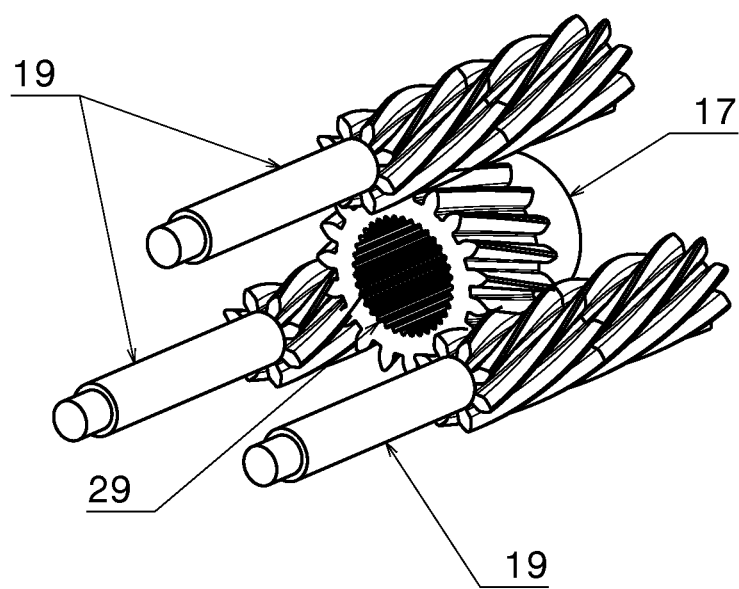
FIG. 9 is a perspective view of the other side gear meshed with the other set of the pinion gears of the differential.
Figure 10:
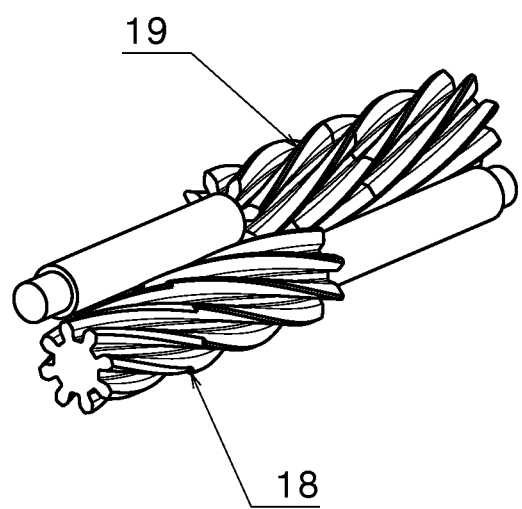
FIG. 10 is a perspective view of one pinion gear of one set of pinion gears meshed with one pinion gear of the other set of pinion gears.
Figure 11:
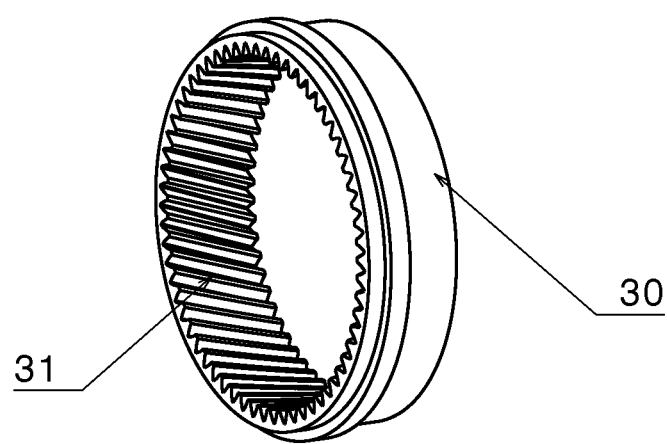
FIG. 11 is a perspective view of the sleeve.
Figure 12:
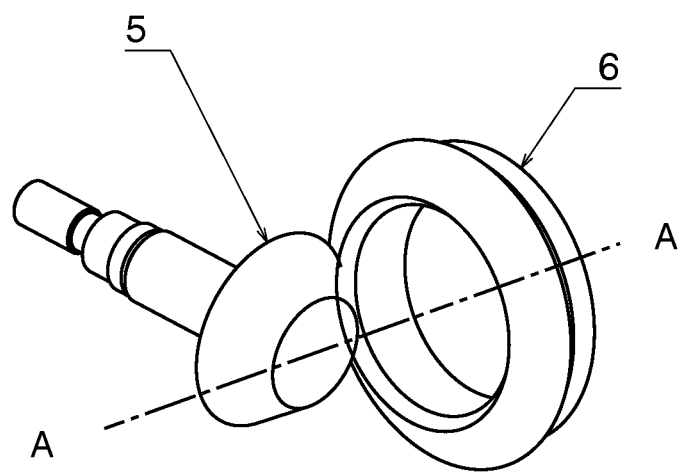
FIG. 12 is a perspective view of the input gear meshed with the gear, the gear being firmly connected to the differential as explained in the specification.

Referring to FIGS. 3, 4, 5, 6, and 7, the differential 200 comprises a differential housing 13, a differential cover 14, two sleeves 15, a side gear 16, a side gear 17, a set of pinion gears 18, and a set of pinion gears 19. The differential housing 13 and the differential cover 14 are firmly connected to each other with screws (not shown). The side gear 16 is pivotally located in a bore 20 at the center of the differential cover 14. The side gear 17 is pivotally located in a bore 24 at the center of the differential housing 13. The side gear 16 and 17 are located co-axial, and can rotate about the axis A. The side gear 16 and 17 are cylindrical helical gears. The set of pinion gears 18 are pivotally located in a set of bores 25 on the differential housing 13 and a set of bores 21 on the differential cover 14. The set of pinion gears 19 are pivotally located in a set of bores 26 on the differential housing 13 and a set of bores 22 on the differential cover 14. In this embodiment, there are three pinion gear 18 and three pinion gear 19. The pinion gears 18 and 19 are cylindrical, helical gears. In this embodiment, the axis of the pinion gears 18 and 19 are parallel to the axis A. Referring to FIG. 8, the pinion gears 18 mesh with the side gear 16. Referring to FIG. 9, the pinion gears 19 mesh with the side gear 17. Referring to FIG. 10, the pinion gears 18 and 19 are paired, e.g. one pinion gear 18 meshes with one pinion gear 19. Referring to FIGS. 6, 7, and 11, the sleeve 15 has a journal 30 on its exterior and a plural of teeth 31 on its interior. The differential housing 13 has a bore 27, the differential cover has a bore 23. One sleeve 15 is firmly assembled onto the differential housing 13 with its journal 30 being fitted to the bore 27 of the differential housing 13. The other sleeve 15 is firmly assembled onto the differential cover 14 with its journal 30 being fitted to the bore 23 of the differential cover 14. The sleeves 15 can be welded onto the differential housing 13 and the differential cover 14 after assembled. Referring to FIG. 3, the gear 6 is firmly connected to the differential housing 13 with screws (not shown) or other means, like welding. Referring to FIG. 12, the input gear 5 meshes with the gear 6 (gear teeth are not shown). In this embodiment, the input gear 5 and the gear 6 are bevel gears.

Referring to FIG. 8, the side gear 16 has spline 28 in its bore. A shaft (not shown) is rotationally drivingly coupled to the side gear 16 through the spline 28 at one end, while the other end coupled, for an example, to a wheel of the vehicle axle 100. Referring to FIG. 9, the side gear 17 has spline 29 in its bore. Another shaft (not shown) is rotationally driving coupled to the side gear 17 through the spline 29 at one end, while the other end coupled, for an example, to the other wheel of the vehicle axle 100.

Figure 13:
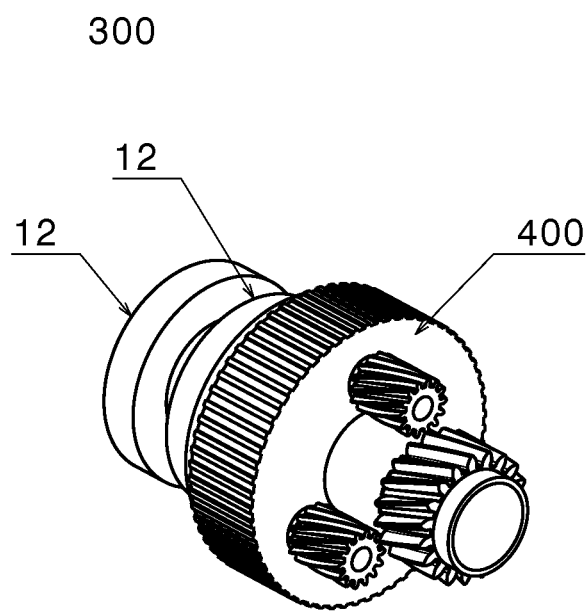
FIG. 13 is a perspective view of the gear mechanism of the vehicle axle of FIG. 1.
Figure 14:
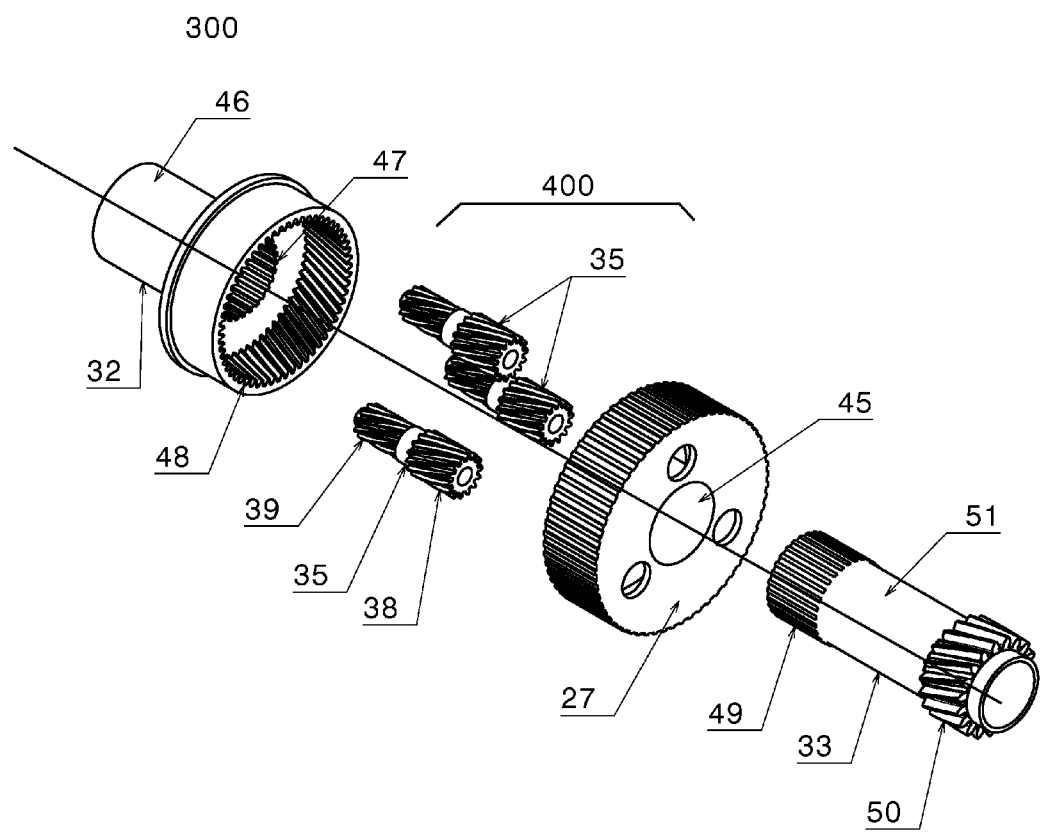
FIG. 14 is a perspective view of the gear mechanism of FIG. 13, with each component shown separately.
Figure 15:
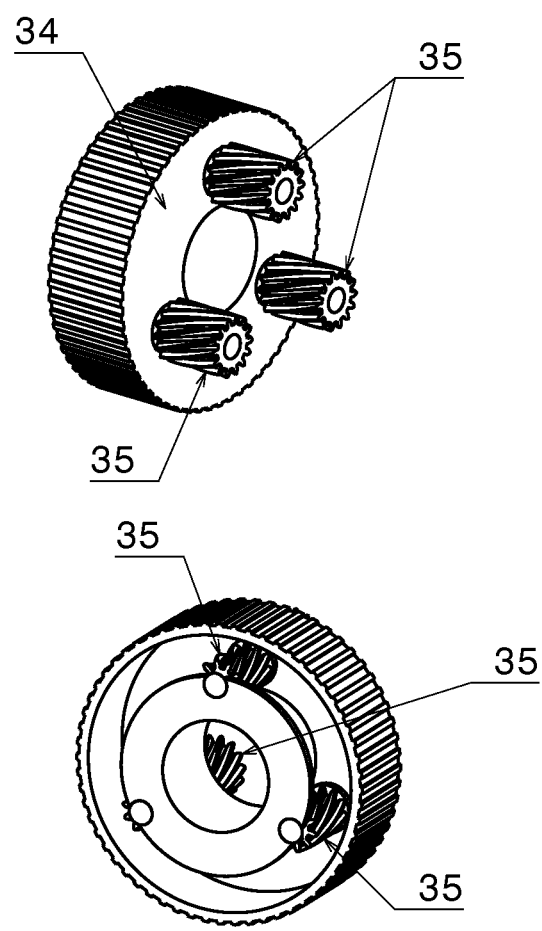
FIG. 15 are two perspective views of the planet gear assembly in the gear mechanism of FIG. 13.
Figure 16:
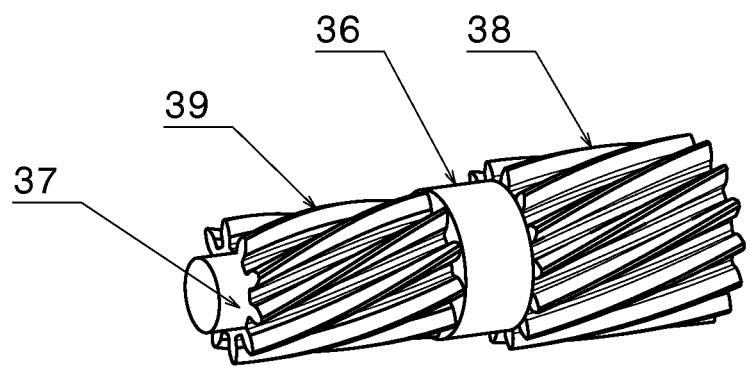
FIG. 16 is a perspective view of the planet gear of the planet gear assembly of FIG. 15.
Figure 17:
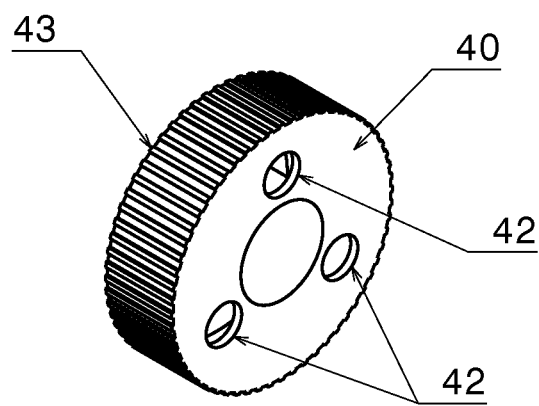
FIG. 17 are two perspective views of the carrier of the planet gear assembly of FIG. 15.
Figure 17:
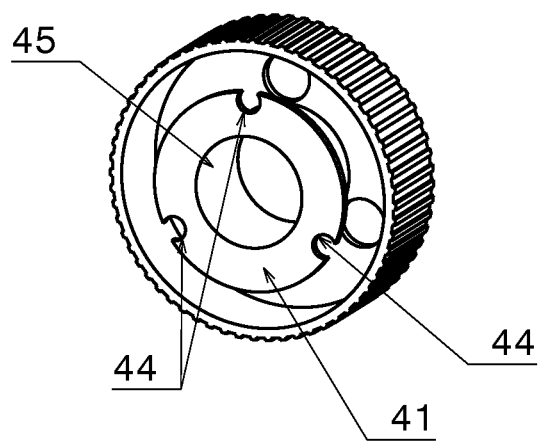
Figure 18:
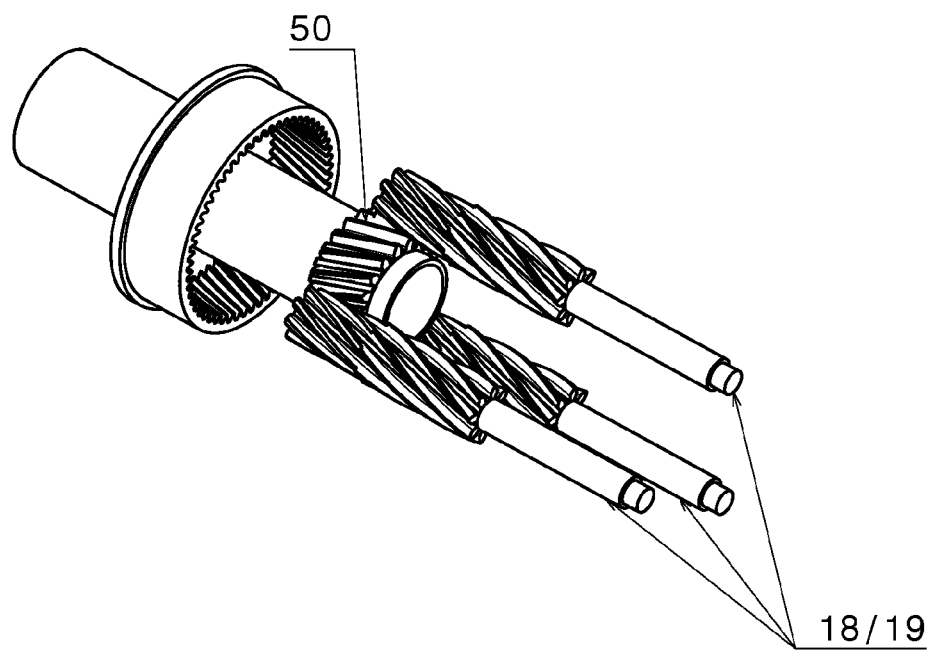
FIG. 18 is a perspective view with the engaging gear of the gear mechanism of FIG. 13 meshed with one set of the pinion gears of the differential of FIG. 3.

Referring to FIGS. 13 and 14, the gear mechanism 300 has a planet gear assembly 400, a hub 32, a shaft 33. Referring to FIG. 15, the plant gear assembly 400 has a carrier 34, is set of planet gears 35. Referring to FIG. 16, the planet gear 35 has a journal 36, a journal 37, a plural of teeth 38, a plural of teeth 39. Referring to FIG. 17, the carrier 34 comprises a piece 40 and a piece 41. The piece 40 has a set of bores 42 on its end wall, and splines 43 on its outer wall. The piece 41 has a set of bores 44 on its end wall, and a bore 45 at its center. The outer wall with the splines 43 are centered at the bore 45 of the piece 41. The planet gears 35 are pivotally supported individually with the bores 42 holding the journals 36, the bores 44 holding the journals 37. The piece 40 and 41 are firmly assembled together after the set of planet gears 35 are assembled through, for an example, welding.

Referring to FIG. 14, the hub 31 has a journal 46 on the exterior of its smaller cylindrical feature, splines 47 on portion of the interior of its smaller cylindrical feature, and a plural of teeth 48 on the interior of its larger cylindrical feature. The shaft 33 has splines 49 at one end, an engaging gear 50 at the other end, and a journal 51 in the middle. At assembled, the planet gear assembly 400 is pivotally supported with the bore 45 being fitted to the journal 51, the shaft 33 is firmly supported with the splines 49 being fitted to the spline 47. Referring to FIGS. 1 and 14, the hub 32 of the gear mechanism 300 is pivotally supported through the bearings 12, which are mounted on the journal 46, inside the cover 4.

Referring to FIGS. 1, 3, 4, 11, 14, and 18, the plural of teeth 38 of the planet gears 35 engage the plural of teeth 31 of the sleeve 15, the plural of teeth 39 of the planet gears 35 engage the plural of teeth 48 of the hub 32. The engaging gear 50 of the gear mechanism 300 on the C side meshes with the set of pinion gears 18. The engaging gear 50 of the gear mechanism 300 on the D side meshes with the set of pinion gears 19. The pitch diameter of the plural of teeth 38 is different than the pitch diameter of the plural of teeth 39. Hence, the gear ratio of plural of teeth 31 to the plural of teeth 38 is different than the gear ratio of the plural of teeth 48 to the plural of teeth 39. In this embodiment, the gear ratio of the plural of teeth 31 to the plural of teeth 38 is larger than the gear ratio of the plural of teeth 48 to the plural of teeth 39.

Referring to FIG. 1, the clutches 10 interface with the gear mechanisms 300 through the spline 43 on the carrier 34. When one of the actuators 11 is activated and the corresponding clutch 10 engages, the corresponding carrier 34 is held firmly and does not rotate. The rotational motion of the differential housing 13 and the differential cover 14 is transferred to the corresponding engaging gear 50 through the corresponding set of planet gears 35. The corresponding engaging gear 50 rotates at a different speed than that of the differential housing 13 and the differential cover 14.

Figure 19:
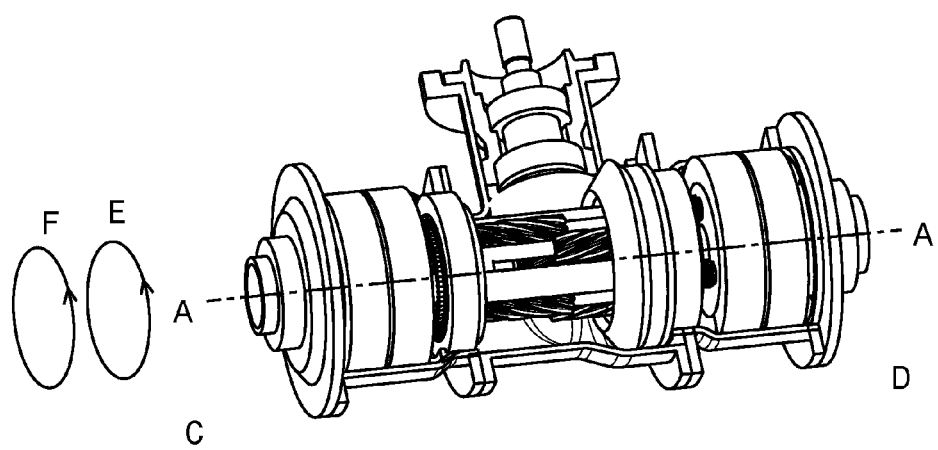
FIG. 19 is a perspective view of the vehicle axle of FIG. 1 in one scenario.

FIG. 19 shows a first scenario where both of the actuators 11 are de-activated and the clutches 10 disengage. When the vehicle drives straight, forward on pavement, and there is no slippery between the wheels and the surface of the pavement, a driving torque E is transferred from the input gear 5 through the gear 6, the differential housing 13 and the differential cover 14, the pinion gears 18 and 19, onto the side gear 16 and 17, and continuously onto the wheels through the respective shafts. The driving tongue E is evenly distributed between the side gear 16 and 17. The driving torque meets the resistant torque from the surface of the pavement to the wheels. From Newton's third law, the driving torque pushes the pavement rearward while the resistant torque pushes the vehicle forward. The differential housing 13 and the differential cover 14 rotate with a speed F. The side gear 16 and 17 rotate along with the differential housing 13 and the differential cover 14 at the same rotational speed. The pinion gears 18 and 19 rotate along with the differential housing 13 and the differential cover 14 at the same rotational speed as that of the differential housing 13 and the differential cover 14. They do not rotate about their own axis. The set of planet gears 35 being driven by the plural of teeth 31 of the sleeve 15, the engaging gear 49 being driven by the set of the pinion gears 18, and the carrier 34 can rotate freely without being held by the clutch 10, the gear mechanism 300 on the C side rotates along with the differential housing 13 and the differential cover 14 at the same rotational speed as that of the side gear 16 and the differential housing 13 and the differential cover 14. The gear mechanism 300 on the D side does the same.

When the vehicle makes turns on pavement, one wheel rotates slower than the other wheel. The wheel, which will rotate slower, meets an additional resistant torque. The additional resistant torque makes the wheel rotate slower. The additional resistant torque is transferred through the shaft connected to the wheel, the side gear connected to the shaft through spline, the pinion gears, the other side gear and shaft onto the other wheel. The additional resistant torque transferred makes that wheel rotate faster. The pinion gears 18 and 19 rotate about their axis while rotating along with the differential housing 13 and the differential cover 14. The side gear 16 and 17 rotate at different rotational speed than that of the differential housing 13 and the differential cover 14. For the side C, the planet gears 35 being driven by the differential cover 14, the engaging gear 50 being driven by the pinion gears 18, the carrier 34 rotates at a differential speed than that of the differential cover 14 and that of the side gear 16. Since the corresponding actuator 11 is deactivated and the corresponding clutch disengages, the carrier 34 rotates along with, without transferring or taking any torque. The gear mechanism 300 on the D side does the same. This is equivalent to the conventional open differential as understood by those skilled in the art.

When the vehicle drives on surface other than pavement, and there might be slippery condition. Often, the surface can not provide resistant torque which matches the driving torque, and one or multiple driving wheels lose traction. If one of the wheels of the vehicle axle 100 loses traction and runs into free spin momentarily, and the resistant torque still push the other wheel forward, the vehicle will get a sudden, unexpected rotation in yaw followed by losing traction on both wheels.

A second scenario is when both of the actuators 10 are activated and both of the clutches 11 engage and hold each of the carrier 34. Both of the both carrier 34 do not rotate. The torque and speed of the differential housing 13 and the differential cover 14 are transferred to both of the hubs 32 and both of the engaging gears 50 through each of the sets of the planet gears 35. Both of the engaging gears 50 rotate at the same speed. Being driven by the differential housing 13 and the differential cover 14, and the engaging gear 50, each of the pinion gears 18 rotates about its own axis while rotating about the axis A. Being driven by the differential housing 13 and the differential cover 14, and the engaging gear 50, each of the pinion gears 19 rotates about its own axis while rotating about the axis A. The individual and the common rotations of the pinion gears 18 have the same speeds as those of the individual and the common rotations of the pinion gears 19. This is equivalent to the conventional differential lock as understood by those skilled in the art. It can be used to regain traction when one of the wheels encounter slippery condition and lose traction.

Figure 20:
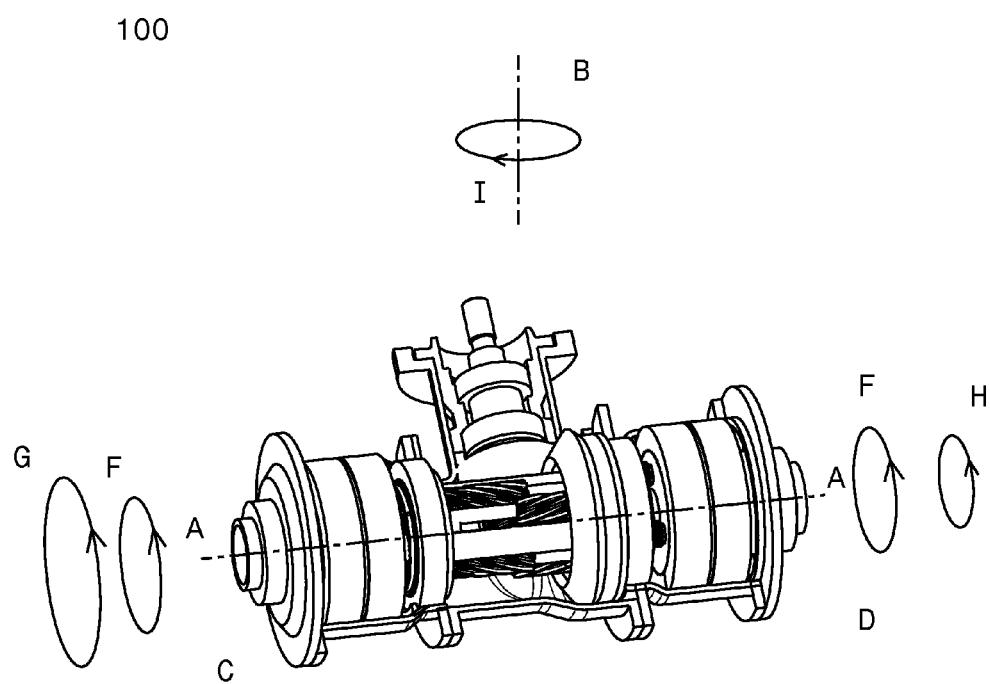
FIG. 20 is a perspective view of the vehicle axle of FIG. 1 in another scenario.

A third scenario is when the one of the actuators 11 is activated and the corresponding clutches 10 engages and holds the corresponding carrier 34 of the corresponding gear mechanisms 300, while the other actuator 11 is not activated and the other corresponding clutch 10 is disengaged and does not hole the other corresponding carrier 34. Referring to FIG. 20 for the first case, the actuator 11 on the C side is activated, the corresponding clutch 10 engages and holds the carrier 34 of the corresponding gear mechanism 300. The carrier 34 does not rotate. The torque E and the speed F is transferred from the differential housing 13 and the differential cover 14 to the hub 32 and the engaging gear 50 through the set of planet gears 35. The engaging gear 50 rotates at the speed G. The speed G is different than the speed F, and is larger since the gear ratio of plural of teeth 31 of the sleeve 15 to the plural of teeth 38 of the planet gears 35 is larger than the gear ratio of the plural of teeth 48 of the hub 32 to the plural of teeth 39 of the planets gears 35. Being driven by the differential housing 13 and the differential cover 14 at the speed F, and the engaging gear 50 at the speed G, each of the pinion gears 18 rotates about its own axis while they rotate about the axis A. Being driven by the pinion gears 18, the side gear 16 rotates at the speed G.

The actuator 11 on the D side is deactivated and the corresponding clutch is disengaged. The carrier 34 of the gear mechanism 300 on the D side is not held. The torque E and the speed F are not transferred from the differential housing 13 and the differential cover 14 to the hub 32 and the engaging gear 50. The individual rotation of the pinion gears 18 is transferred to the pinion gears 19. Being driven by the pinion gears 19, the side gear 17 rotates at the speed H. The speed H is smaller than the speed F. The difference between the speed G and F is equal in the amount, opposite is direction, to the difference between the speed H and the speed F. Thus, the wheel connected to the side gear 16 rotates faster, the wheel connected to the side gear 17 rotates slower, a yaw I about the axis B is introduced consequently.

On the D side, the engaging gear 50 is driven by the pinion gears 19, and in turn, it drives the set of planet gears 35 through the hub 32. The sleeve 15 also drives the set of planet gears 35. Thus, each of the planet gears 35 rotates about its own axis, while rotating about the axis A. The carrier 34 rotates along with the set of planet gears 35, without transferring or taking any torque.

Figure 21:
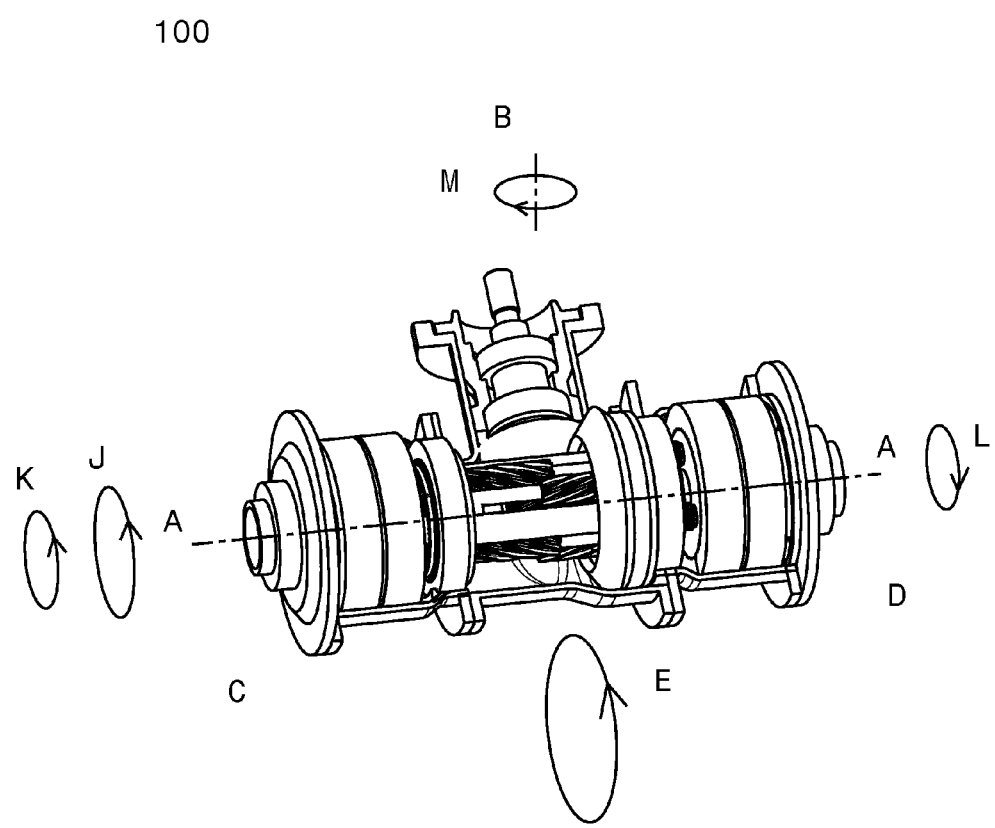
FIG. 21 is a perspective view of the vehicle axle of FIG. 1 in the scenario of FIG. 20.

Referring to FIG. 21, the torque J on the engaging gear 50 on the C side is a portion of the torque E transferred through the planet gears 35. The torque J is equally divided between the pinion gears 18 and 19, and further transferred to the side gears 16 and 17. A torque K on the side gear 16 is transferred from engaging gear 50 through the pinion gears 18. A torque L on the side gear 17 is transferred from the engaging gear 50 through the pinion gears 19. The torque L is equal in amplitude, opposite in direction to the torque K. The rest of the torque E is equally transferred from the differential housing 13 and differential cover 14 to the side gear 16 through the pinion gears 18, and to the side gear 17 through the pinion gears 19. The torque K is transferred to the wheel of the vehicle axle 100 on the C side. The torque L is transferred to the wheel of the vehicle axle 100 on the D side. With both wheels interacting with road surface, the torque K and L, along with the distance between the two wheels, form is couple M. Couple, as understood in physics/mechanics, is defined as a pair of forces equal in amplitude, opposition in direction, over a distance. A couple is more effective to introduce a turn, or a yaw in this application, than a torque.

The second case is when the actuator 11 on the D side is activated, and the corresponding clutch 10 engages and holds the carrier 34 of the corresponding gear mechanism 300, the carrier 34 does not rotate. The actuator 11 on the C side is de-activated, and the corresponding clutch 10 is disengaged, the carrier 34 can rotate along with. This case is the reverse of the first case.

Figure 22:
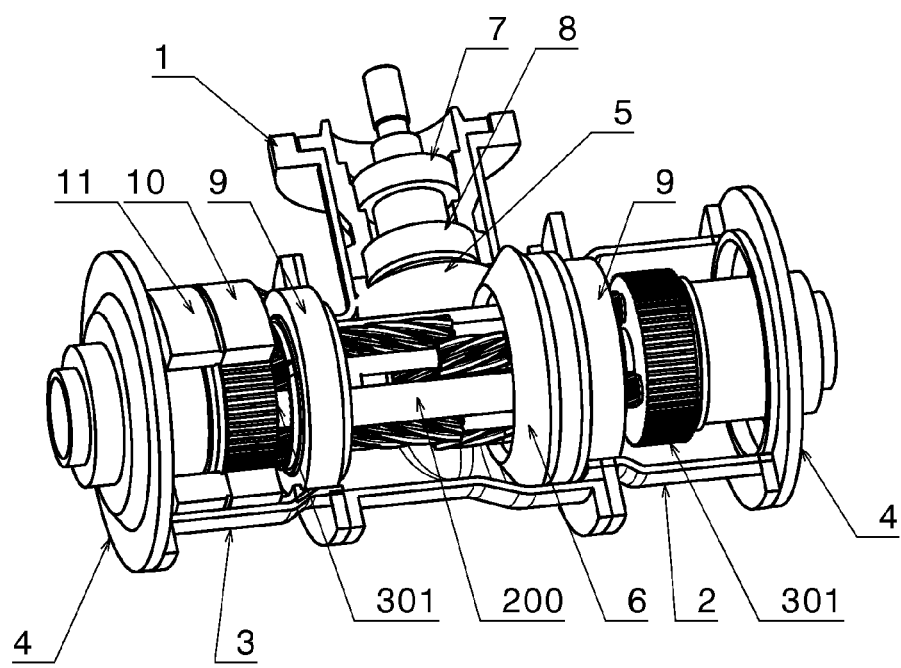
FIG. 22 is a perspective view of the vehicle axle in another embodiment.
Figure 23:
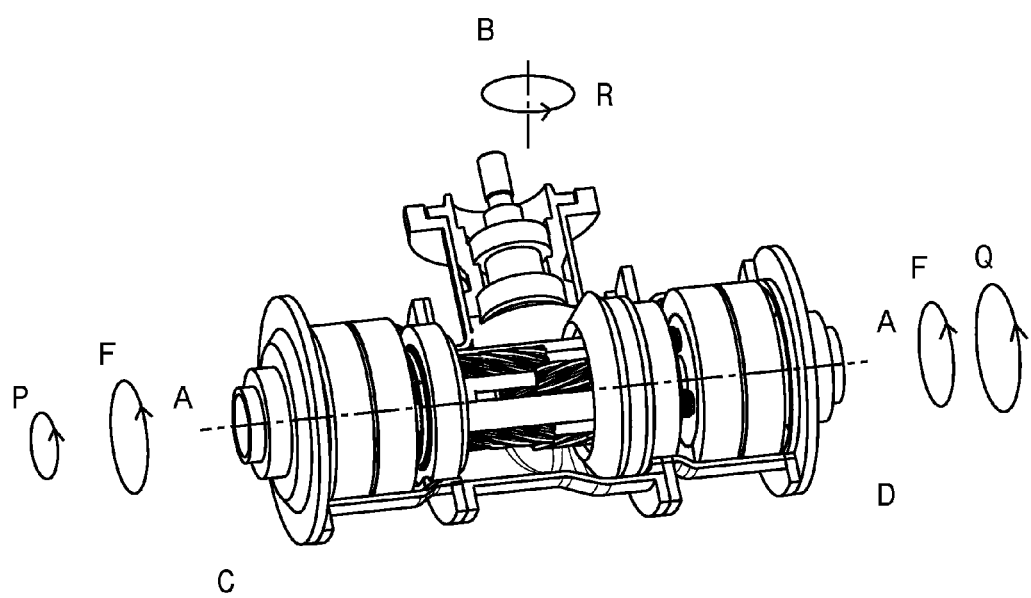
FIG. 23 is a perspective view of the vehicle axle of FIG. 22 one scenario.

Referring to FIG. 22, a second embodiment where a vehicle axle 101 composes the housing 1, the housing 2, the housing 3, the two covers 4, the input gear 5, the gear 6, the differential 200, the two clutches 10, the two actuators 11, and the two gear mechanisms 301. The gear mechanism 301 has the identical components and construction as the gear mechanism 300, except that the gear ratio of the plural of teeth 31 to the plural of teeth 38 is smaller that the gear ratio of the gear ratio of the plural of teeth 48 to the plural of teeth 39. The vehicle axle 101 behaves the same in the first and second scenarios as the vehicle axle 100. Referring to FIG. 23 for the first case of the third scenario, the speed P of the engaging gear 50 on the C side is smaller than the speed F. Being driving by the differential housing 13 and the differential cover 14 at the speed F, and the engaging gear 50 at the speed P, each of the pinion gears 18 rotates about its own axis while they rotate about the axis A. Being driven by the pinion gears 18, the side gear 16 rotates at the speed P.

The actuator 11 on the D side is deactivated and the corresponding clutch is disengaged. The carrier 34 of the gear mechanism 300 on the D side is not held. The torque E and the speed F are not transferred from the differential housing 13 and the differential cover 14 to the hub 32 and the engaging gear 50. The individual rotation of the pinion gears 18 is transferred to the pinion gears 19. Being driven by the pinion gears 19, the side gear 17 rotates at the speed Q. The speed Q is larger than the speed F. The difference between the speed P and F is equal in the amount, opposite is direction, to the difference between the speed Q and the speed F. Thus, the wheel connected to the side gear 16 rotates slower, the wheel connected to the side gear 17 rotates faster, a yaw R about the axis B is introduced consequently.

Figure 24:
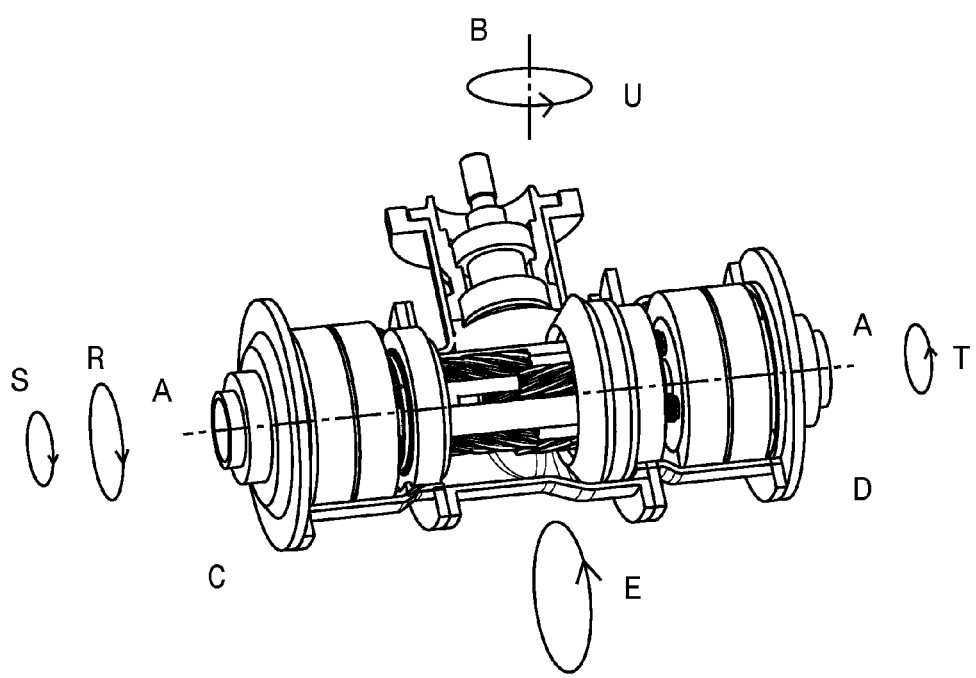
FIG. 24 is a perspective view of the vehicle axle of FIG. 22 in the scenario of FIG. 23.

Referring to FIG. 24, the torque R on the engaging gear 50 on the C side is a portion of the torque E transferred through the planet gears 35. The torque R is equally divided between the pinion gears 18 and 19, and further transferred to the side gears 16 and 17. A torque S on the side gear 16 is transferred from engaging gear 50 through the pinion gears 18. A torque T on the side gear 17 is transferred from the engaging gear 50 through the pinion gears 19. The torque T is equal in amplitude, opposite in direction to the torque S. The rest of the torque E is equally transferred from the differential housing 13 and differential cover 14 to the side gear 16 through the pinion gears 18, and to the side gear 17 through the pinion gears 19. The torque S is transferred to the wheel of the vehicle axle 101 on the C side. The torque T is transferred to the wheel of the vehicle axle 101 on the D side. With both wheels interacting with road surface, the torque S and T, along with the distance between the two wheels, form a couple U. Couple, as understood in physics/mechanics, is defined as a pair of forces equal in amplitude, opposition in direction, over a distance. A couple is more effective to introduce a turn, or a yaw in this application, than a torque.

This invention provides to automotive driving a design and implementation of automotive differential combining conventional open differential, differential lock, and torque vectoring all together. The torque vectoring is applied to the pinion gears of the differential. A portion of the driving torque is diverted for torque vectoring. More specifically, the portion of the driving torque is transferred through a gear mechanism to the pinion gears of the differential, and resulted in a coupled applied to both wheels of the vehicle axle. Applying a couple to both wheels of a vehicle axle is more effective than applying a torque to one of the two wheels of the vehicle axle for torque vectoring.

What is claimed is:

1. A vehicle axle comprising:
   (a) a housing;
   (b) a differential housing, a differential cover;
   (c) said differential housing and said differential cover are firmly connected to each other;
   (d) said differential housing and said differential cover are pivotally located in said housing;
   (e) a first side gear pivotally located in said differential housing and said differential cover, a second side gear pivotally located in said differential housing and said differential cover;
   (f) said first side gears, said second side gear, said differential housing, and said differential cover are co-axial;
   (g) a first set of pinion gears pivotally located in said differential housing and said differential cover, a second set of pinion gears pivotally located in said differential housing and said differential cover;
   (h) pivot axis of each said first pinion gear is parallel to pivot axis of said first side gear, pivot axis of each said second pinion gear is parallel to pivot axis of said second side gear;
   (i) said first set of pinion gears mesh with said first side gear, said second set of pinion gears mesh with said second side gear;
   (j) said first pinion gears mesh with said second pinion gears in pairs;
   (k) said differential housing has a plural of teeth; said differential cover has a plural of teeth;
   (l) a first engaging gear pivotally located in said housing, a second engaging gear pivotally located in said housing;
   (m) said first engaging gear is co-axial with said first side gear, said second side gear, said differential housing, and said differential cover; said second engaging gear is co-axial with said first side gear, said second side gear, said differential housing, and said differential cover;
   (n) said first engaging gear meshes with said first set of pinion gears; said second engaging gear meshes with said second set of pinion gears;
   (o) a first gear mechanism pivotally located in said housing, a second gear mechanism pivotally located in said housing;
   (p) said first gear mechanism is co-axle with said first side gear, said second gear mechanism is co-axle with said second side gear;
   (q) said first gear mechanism engages said differential housing through said plural of teeth of said differential housing; said second gear mechanism engages said differential cover through said plural of teeth of said differential cover;
   (r) said first gear mechanism engages said first engaging gear, said second gear mechanism engages said second engaging gear;
   (s) a first clutch is firmly supported in said housing, said first clutch interfaces said first gear mechanism;
   (t) a second clutch is firmly supported in said housing, said second clutch interfaces said second gear mechanism.

2. Said first gear mechanism, said second gear mechanism set forth in claim 1 wherein said first gear mechanism transfers rotational motion of said differential housing and said differential cover to said first engaging gear when said first clutch engages, said first gear mechanism does not transfer rotational motion of said differential housing and differential cover to said first engaging gear when said first clutch disengages; said second gear mechanism transfers rotational motion of said differential housing and said differential cover to said second engaging gear when said second clutch engages, said second gear mechanism does not transfer rotational motion of said differential housing and said differential cover to said second engaging gear when said second clutch disengages.

3. The said first gear mechanism, said second gear mechanism set forth in claim 2 wherein
   (a) said first gear mechanism has a first planet gear assembly, said second gear mechanism has a second planet gear assembly;
   (b) said first gear mechanism has a first hub with a plural of teeth, said first hub is firmly connected to said first engaging gear; said second gear mechanism has a second hub with a plural of teeth, said second hub is firmly connected to said second engaging gear;
   (c) said first planet gear assembly comprises a first carrier, a first set of planet gears, each planet gear of said first set of planet gears is pivotally supported in said first carrier;
   (d) said second planet gear assembly comprises a second carrier, a second set of planet gears, each planet gear of said second set of planet gears is pivotally supported in said second carrier;
   (e) said first planet gear assembly is pivotally supported on said first hub, said second is pivotally supported on said second hub;
   (f) each planet gear of said first set of planet gears has a first plural of teeth at one end, a second plural of teeth at the other end;
   (g) each planet gear of said second set of planet gears has a third plural of teeth at one end, a fourth plural of teeth at the other end;
   (h) said first plural of teeth engages said plural of teeth of said differential housing, said second plural of teeth engages said plural of teeth of said first hub;
   (i) said third plural of teeth engages said plural of teeth of said differential cover, said fourth plural of teeth engages said plural of teeth of said second hub;
   (j) said first clutch interfaces said first carrier, said first carrier does not rotate when said first clutch engages, said first carrier can rotate when said first clutch disengages;

(k) said second clutch interfaces said second carrier, said second carrier does not rotates when said second clutch engages, said second carrier can rotate when said second clutch disengages.

4. Said first gear mechanism, said second gear mechanism set forth in claim 3 wherein a first gear ratio of said plural of teeth of said differential housing to said first engaging gear is different than one; a second gear ratio of said plural of teeth of said differential cover to said second engaging gear is different than one.

5. Said first gear mechanism, said second gear mechanism set forth in claim 4 wherein said first gear ratio of said plural of teeth of said differential housing to said first engaging gear is larger than one; said second gear ratio of said plural of teeth of said differential cover to said second engaging gear is larger than one.

6. Said first gear mechanism, said second gear mechanism set forth in claim 5 wherein said first gear ratio of said plural of teeth of said differential housing to said first engaging gear is equal to said second gear ration of said plural of teeth of said differential cover to said second engaging gear.

7. A vehicle axle comprising:
(a) a housing;
(b) a differential housing, a differential cover;
(c) said differential housing and said differential cover are firmly connected to each other;
(d) said differential housing and said differential cover are pivotally located in said housing;
(e) a first side gear pivotally located in said differential housing and said differential cover, a second side gear pivotally located in said differential housing and said differential cover;
(f) said first side gear, said second side gear, said differential housing, and said differential cover are co-axial;
(g) a first set of pinion gears pivotally located in said differential housing and said differential cover, a second set of pinion gears pivotally located in said differential housing and said differential cover;
(h) pivot axis of each said first pinion gear is parallel to pivot axis of said first side gear, pivot axis of each said second pinion gear is parallel to pivot axis of said second side gear;
(i) said first set of pinion gears mesh with said first side gear, said second set of pinion gears mesh with said second side gear;
(j) said first pinion gears mesh with said second pinion gears in pairs;
(k) said differential housing has a plural of teeth; said differential cover has a plural of teeth;
(l) a first engaging gear pivotally located in said housing, a second engaging gear pivotally located in said housing;
(m) said first engaging gear is co-axial with said first side gear, said second side gear, said differential housing, and said differential cover; said second engaging gear is co-axial with said first side gear, said second side gear, said differential housing, and said differential cover;
(n) said first engaging gear meshes with said first set of pinion gears; said second engaging gear meshes with said second set of pinion gears;
(o) a first gear mechanism pivotally located in said housing, a second gear mechanism pivotally located in said housing;
(p) said first gear mechanism is co-axle with said first side gear, said second gear mechanism is co-axle with said second side gear;
(q) said first gear mechanism engages said differential housing through said plural of teeth of said differential housing; said second gear mechanism engages said differential cover through said plural of teeth of said differential cover;
(r) said first gear mechanism engages said first engaging gear, said second gear mechanism engages said second engaging gear;
(s) a first clutch is firmly supported in said housing, said first clutch interfaces said first gear mechanism;
(t) a second clutch is firmly supported in said housing, said second clutch interfaces said second gear mechanism.

8. Said first gear mechanism, said second gear mechanism set forth in claim 7 wherein said first gear mechanism transfers rotational motion of said differential housing and said differential cover to said first engaging gear when said first clutch engages, said first gear mechanism does not transfer rotational motion of said differential housing and differential cover to said first engaging gear when said first clutch disengages; said second gear mechanism transfers rotational motion of said differential housing and said differential cover to said second engaging gear when said second clutch engages, said second gear mechanism does not transfer rotational motion of said differential housing and said differential cover to said second engaging gear when said second clutch disengages.

9. The said first gear mechanism, said second gear mechanism set forth in claim 8 wherein:
(a) said first gear mechanism has a first planet gear assembly, said second gear mechanism has a second planet gear assembly;
(b) said first gear mechanism has a first hub with a plural of teeth, said first hub is firmly connected to said first engaging gear; said second gear mechanism has a second hub with a plural of teeth, said second hub is firmly connected to said second engaging gear;
(c) said first planet gear assembly comprises a first carrier, a first set of planet gears, each planet gear of said first set of planet gears is pivotally supported in said first carrier;
(d) said second planet gear assembly comprises a second carrier, a second set of planet gears, each planet gear of said second set of planet gears is pivotally supported in said second carrier;
(e) said first planet gear assembly is pivotally supported on said first hub, said second is pivotally supported on said second hub;
(f) each planet gear of said first set of planet gears has a first plural of teeth at one end, a second plural of teeth at the other end;
(g) each planet gear of said second set of planet gears has a third plural of teeth at one end, a fourth plural of teeth at the other end;
(h) said first plural of teeth engages said plural of teeth of said differential housing, said second plural of teeth engages said plural of teeth of said first hub;
(i) said third plural of teeth engages said plural of teeth of said differential cover, said fourth plural of teeth engages said plural of teeth of said second hub;
(j) said first clutch interfaces said first carrier, said first carrier does not rotate when said first clutch engages, said first carrier can rotate when said first clutch disengages;
(k) said second clutch interfaces said second carrier, said second carrier does not rotates when said second clutch engages, said second carrier can rotate when said second clutch disengages.

10. Said first gear mechanism, said second gear mechanism set forth in claim 9 wherein a first gear ratio of said plural of teeth of said differential housing to said first engaging gear is different than one; a second gear ratio of said plural of teeth of said differential cover to said second engaging gear is different than one.

11. Said first gear mechanism, said second gear mechanism set forth in claim 10 wherein said first gear ratio of said plural of teeth of said differential housing to said first engaging gear is smaller than one; said second gear ratio of said plural of teeth of said differential cover to said second engaging gear is smaller than one.

12. Said first gear mechanism, said second gear mechanism set forth in claim 11 wherein said first gear ratio of said plural of teeth of said differential housing to said first engaging gear is equal to said second gear ration of said plural of teeth of said differential cover to said second engaging gear.

* * * * *